March 25, 1941. L. S. BUSKIRK ET AL 2,236,165
METHOD AND APPARATUS FOR SEPARATING MINERALS
Filed June 19, 1939 2 Sheets-Sheet 2
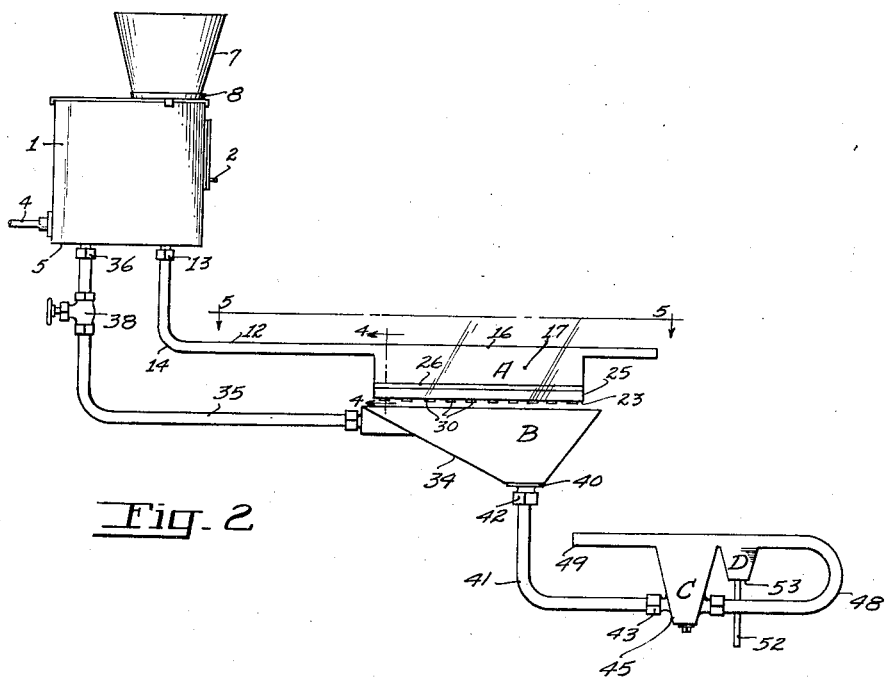
Fig. 2
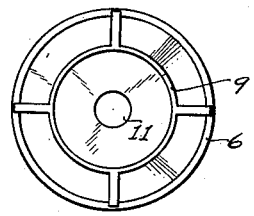
Fig. 3
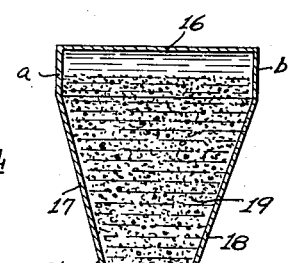
Fig. 4
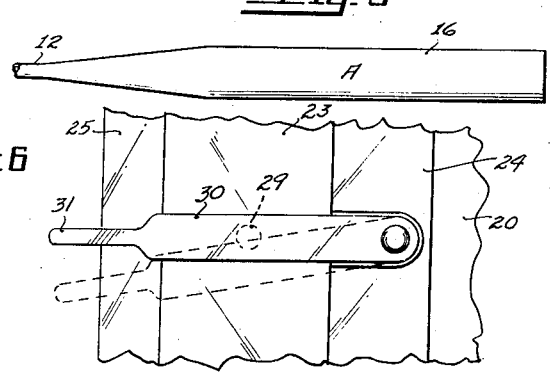
Fig. 5
Fig. 6
LEE S. BUSKIRK
PAUL R. REID
INVENTORS
BY Samuel S. Jacobson
ATTORNEY Patented Mar. 25, 1941

2,236,165

UNITED STATES PATENT OFFICE 2,236,165

METHOD AND APPARATUS FOR SEPARATING MINERALS

Lee S. Buskirk and Paul R. Reid, Portland, Oreg.

Application June 19, 1939, Serial No. 279,928

3 Claims. (Cl. 209—18)

This invention relates to a method and an apparatus for treating auriferous earth, alluvial deposits, beach sand, or any other material containing valuable metallic constituents for the purpose of recovering and separating these metallic constituents from the material fed into the apparatus.

There have been many and varied attempts to recover and separate valuable metals from alluvial deposits, beach sand, middlings, tailings and other materials containing metallic constituents of various grades, quality and kind, without marked success. Experience has clearly demonstrated that any valuable metals in a free state are difficult to recover and separate because the metals flow off during the washing process. It is within the contemplation of our invention to provide a method which will permit and insure the recovery of a substantially greater percentage of the valuable metallic constituents contained in any such material.

One of the important objects of the invention is to provide a method for recovering and separating valuable metallic constituents from any material containing the same, employing a portion of said metals to assist in the recovery and separation.

Another object of the invention is to provide apparatus which permits the recovery and separation of metals having different values from any material containing the same.

Still another object of the invention is to provide apparatus which employs in its initial stages a portion of the material being processed as a means for the efficient recovery and separation of the valuable metallic constituents therefrom.

Another object of the invention is to provide apparatus which employs the material being processed as a means for automatically controlling the rate of progress of the material through the apparatus for the purpose of permitting the recovery and separation of the valuable materials therefrom.

Other objects and advantages of the method and apparatus will become apparent from the following detailed description which must be read in conjunction with the accompanying drawings forming a part thereof and in which:

Figure 2 is a side elevation of the apparatus shown in Figure 1;

Figure 3 is a top, plan view of the aggregate measuring funnel showing its position relative to the water intake funnel;

Figure 4 is a sectional elevation of the settling basin embodying the principles of our invention;

Figure 5 is a top, plan view, taken on line 5—5 of Figure 2 looking in the direction indicated, of the launder or flume embodying the principles of our invention; and Figure 6 is an inverted, fragmentary plan view, taken on line 6—6 of Figure 4 looking in the direction indicated, showing the means employed for regulating the openings formed through the bottom of the settling basin.

Identical parts shown in the drawings are indicated by the same reference numerals.

Figure 1:
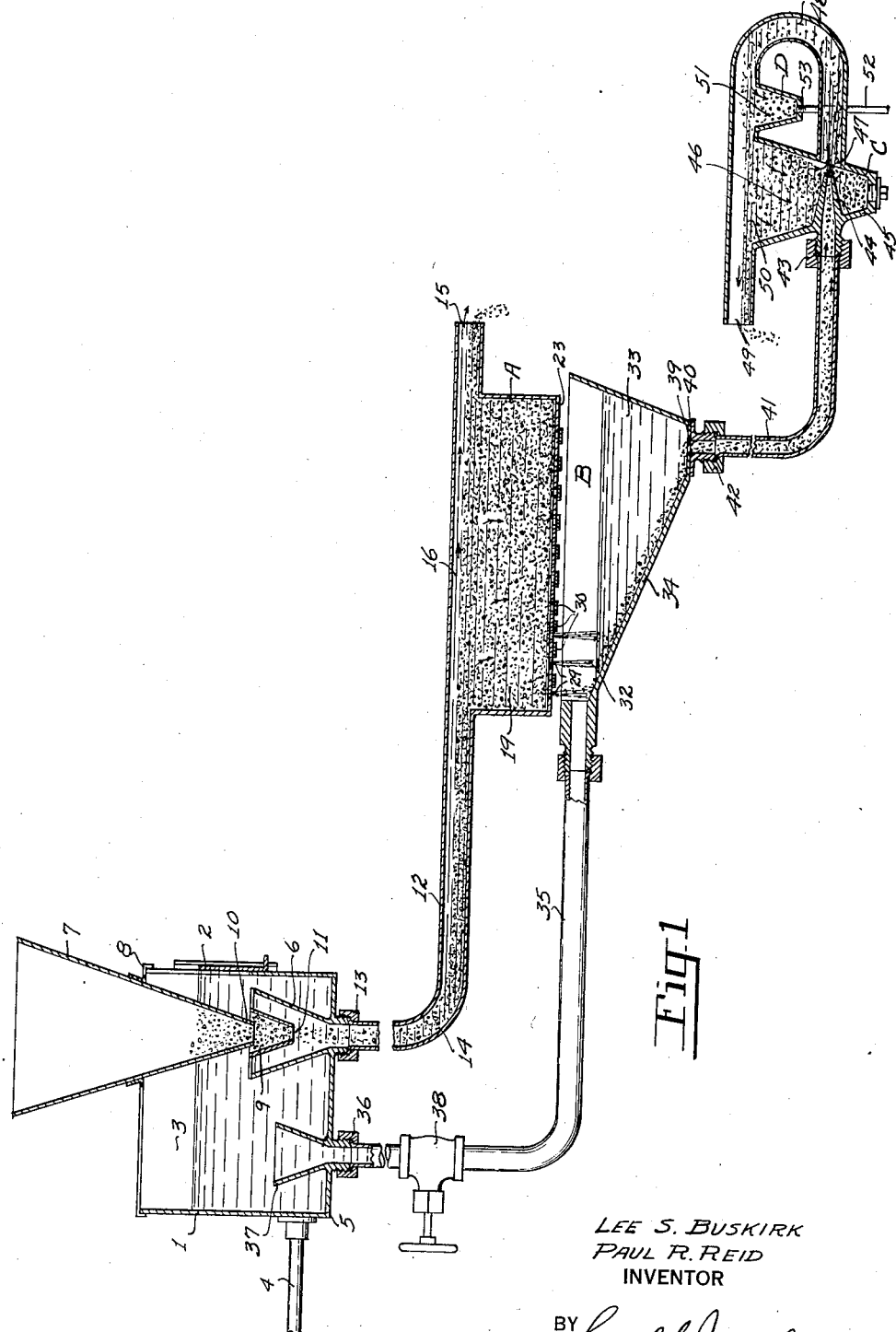
Figure 1 is a sectional, side view of the apparatus embodying the principles of our invention arbitrarily showing, by way of example and for graphic illustration, the position of the material being processed in relation to the launder or flume and settling basin, and the apparatus employed for a more defined separation of the valuable metals.

The apparatus embodying the principles of our invention consists of a tank 1, the contour of which is not controlling and it may be rectangular or cylindrical in shape. A vertically operated overflow gate 2 controls the level of the water contained in the interior 3 of tank 1. A water intake line 4 enters near the base 5 of the tank and is connected to a continuously flowing source of water not shown. A water intake funnel 6 extends upwardly from base 5 within the interior 3 of tank 1. This water intake funnel 6 is at all times submerged by the water confined in the interior 3 of the tank.

An aggregate receiving bin 7 is secured, removably or otherwise, to the top cover 8 of tank 1. An aggregate measuring funnel 9 is removably disposed upon the top of the water intake funnel 6 and is placed in registerable alignment with the mouth 10 of aggregate receiving bin 7. The size of the opening 11 in aggregate measuring funnel 9 determines the rate of flow of the aggregate into the water intake funnel 6. Since the aggregate measuring funnel is removable (see Figure 3), it is possible to substitute funnels having openings of various sizes in order to control and measure the flow of the aggregate into the water intake funnel 6 in order to permit the processing of various types of aggregate under varying conditions.

A launder or flume 12 communicates with and is removably secured to the water intake funnel 6 by any desirable means, as by a threaded nut 13. The launder or flume 12 extends downwardly for a short distance and then is elbowed as shown at 14 so that it is preferably positioned at a slight downward incline relative to tank 1 (see Figures 1 and 2), although it may be positioned horizontally or at even a slight upward incline without materially altering the operation of the apparatus. The launder or flume 12 is preferably made rectangular in cross section but can be oval or cylindrical in cross section without material disadvantage. The outlet 15 of the launder or flume 12 leads to a refuse dump not shown.

A settling basin, designated generally by reference character A, and shown in cross section in Figure 4, is connected to and communicates with launder or flume 12 and is disposed in depending relationship thereto, as shown in Figures 1 and 2. The top 16 of settling basin A is a portion of the top of the launder or flume 12, and the front and rear wall portions $a$ and $b$ which are downwardly disposed at right angles to top 16 are portions of the sides of the launder or flume 12 (see Figure 4). Front wall 17 extends downwardly and inwardly from and is integrally joined to front wall portion $a$ and rear wall 18 extends downwardly and inwardly from and is integrally joined to rear wall portion $b$. The convergence of walls 17 and 18 toward each other results in a corresponding gradual decrease in the size of the interior 19 formed between these walls and wall portions $a$ and $b$. An inwardly inclined shelf 20 is formed within and as a part of wall 18 which extends slightly below the end 21 of wall 17, forming therebetween a restricted passage 22 as best shown in Figure 4. Wall 18 extends downwardly from the shelf 20 for a short distance and at the same degree of inclination as the rest of the wall. A horizontally positioned base 23 is secured to or made integral with the end 24 of wall 18 and an outwardly inclined wall 25 extends upwardly from base 23. A cover 26 is hinged or otherwise movably secured to wall 17 and is seated upon the top 27 of wall 25. It at once becomes obvious that by employing the construction outlined, an elongated pocket 28 is formed which communicates with the interior 19 of settling basin A. A plurality of openings 29 are formed through base 23 and are disposed in spaced parallel relationship to each other. A pivoted closure 30 is provided for each opening 29 and has a handle 31 which is manually manipulated to cover or uncover the respective openings as indicated by dotted lines in Figure 6. It should be pointed out at this time that while the walls 17 and 18 are shown in the drawings as converging toward each other, the apparatus will work equally effectively if they are disposed vertically for a greater distance than that shown by portions $a$ and $b$ before they are allowed to converge.

The type of aggregate and its metallic constituents will largely determine the necessity and desirability of making a more defined recovery and separation. If it is desired to make a still finer recovery and separation of the valuable metals deposited in the interior 19 of settling basin A and trapped in pocket 28, there is provided a water and metal receiving tank, generally designated by reference character B, which is disposed immediately below the base 23 of settling basin A so that the metals issuing forth from the openings 29, as illustrated in Figure 1 and indicated by reference numeral 32 may enter into the interior 33 thereof. The tank B has sharply inclined walls with the exception of wall 34, the inclination of which materially assists in avoiding the unequal distribution of the metals within the interior 33. A water carrying conduit 35 is connected to tank B and communicates with its interior 33 near the top thereof. Conduit 35 is connected in any desirable manner, as by nut 36, with water intake funnel 37 extending upwardly from base 5 of tank 1 and confined within the interior 3 thereof. A valve 38 is disposed in the conduit 35 and controls the rate of flow of water into the interior 33 of tank B, so that only sufficient water enters the interior to act as a means for carrying the valuable metals into the last stages of recovering and separating the same into finer graduations of values, grades and kinds without risk of overflowing the top of the tank. An opening 39 is formed in the base 40 of tank B and a conduit 41 is secured to base 40 in any desirable manner, as by nut 42, and communicates with opening 39.

Conduit 41 is secured by any desirable means, as by nut 43, to a sump, generally designated by reference character C, and carries the water and the valuable metals from tank B to sump C. Sump C is shaped like an inverted frustacone and has a nozzle 44 formed in its side 45 which extends into the interior 46 of sump C and is in direct alignment and positioned in close proximity to opening 47 formed in side 45. A U-shaped conduit 48 is in communication with opening 47 and is adapted to receive, under pressure and at high speed, the water and valuable metals carried in conduit 41. The outlet 49 of the U-shaped conduit 48 leads to a catch basin not shown, where the residual valuable metals carried away by the water after circulating through sump C are recaptured. The top 50 of sump C opens into the base of U-shaped conduit 48 and acts as a temporary catch basin for the valuable metals as they circulate through the U-shaped conduit 48.

A settling basin, designated generally by reference character D, also has its interior 51 in communication with the base of U-shaped conduit 48 and is disposed adjacent to sump C but farther away from outlet 48. An outlet 52 is secured to base 53 of settling basin D and communicates with the interior 51 thereof. This outlet 52 leads to a bin not shown where the finer metals deposited in the interior 51 and drawn off through outlet 53 are stored.

*Modus operandi*

This completes the detailed description of the apparatus employed for recovering and separating materials from a crushed or pulverized aggregate. It is now deemed advisable, in order to present a clear and succinct picture of the method employed for making the recovery and separation, to explain in detail the operation of the apparatus hereinabove described. It is evident that the water contained in the interior 3 of tank 1 will flow into the water intake funnel 6 and that the aggregate in bin 7 will flow by gravity into the aggregate measuring funnel 9. It is also well to point out that, as the water flows into the launder or flume 12 from the water intake funnel 6, a slight vacuum is created adjacent the opening 11 in aggregate measuring funnel 9 which tends to assist the aggregate to fall more easily into and be carried away by the water in the funnel 6. It should be pointed out at this time that the amount of water confined in the interior 3 is determined by the position of the overflow gate 2, and the height of the launder or flume 12 before it assumes the relatively slight inclined position shown in Figures 1 and 2 determines the head for the flow of water. The aggregate containing valuable metallic constituents is obviously held in suspension in the water as it enters into the launder or flume 12. However, since some of the substances, especially the valuable metallic constituents, vary, not only in size but also in specific gravity, they tend to settle first at the bottom of the launder or flume 12 nearest the elbow portion 14 and to build up gradually toward the settling basin A until a layer of the aggregate is formed at the bottom of the launder or flume 12. After this layer is formed, the aggregate settles in the interior of settling basin A and, when the settling basin A is filled up, one or more of the openings 29 are opened up so that, as the sediment in pocket 28 is withdrawn, a slowly sinking, substantially level surface is continuously provided over the entire top surface of the settling basin A.

Since the rate of flow of the water in the launder of flume will be varied in proportion to the amount of aggregate which settles at the bottom of the launder or flume, a rate of flow will be reached that will make it possible for only the valuable constitutents of the aggregate to settle while the less valuable will continue to be held in suspension and pass out through outlet 15. Furthermore, the layer of aggregate at the bottom of the launder or flume offers resistance to the continuous travel of any valuable metals which contact it and contacts of valuable metals with the layer occur more frequently because practically all of them have a specific gravity which is greater than the specific gravity of the less valuable substances forming the aggregate, so that by the time these valuable metals have reached the settling basin, their rate of travel has been perceptibly decreased and have reached almost a state of rest or a state where they need little assistance in reaching a state of rest and by the continuous and substantially even settling of the top surface area in the settling basin A, the valuable metals are permitted to settle at the top of the settling basin A and to be gradually drawn off through openings 29. The double arrows shown in Figure 1 best illustrate the route which the valuable metals follow as they are permitted to settle in the basin A with the metals having the highest specific gravity settling first at the left of the basin. In other words, if the aggregate contains four valuable metals, each having a different specific gravity, the lightest of the metals will settle the farthest to the right in the settling basin and will necessarily require the exposure of more openings so that they too can be drawn off.

Should the operator of this apparatus be satisfied with recovering and separating the metals drawn off through openings 29, the remainder of the apparatus heretofore described would not have to be employed. However, if it is desired to make a more defined recovery and separation, the valuable metals drawn off through openings 29 of settling basin A are permitted to enter into the tank B and again placed in suspension in water contained within the interior 33 thereof. The valuable metals held in suspension within the water are drawn off from the interior 33 and forced, under pressure, through nozzle 44 into the U-shaped conduit 48. As the water in the conduit 48, which holds the valuable metals in suspension, passes over the settling basin D, the same action takes places as that explained for the launder or flume 12 and settling basin A, so that in due time the interior 51 of settling basin D is filled with valuable metals having a certain specific gravity and the remainder of the metals will flow into the interior 46 of sump C and will again, together with some of the material continuously flowing through the nozzle 44 into the U-shaped conduit 48, be forced into the U-shaped conduit 48 until, after a number of continuous circulations, the metals having the same specific gravity will settle within the settling basin D. When the basin D is filled, the metal is slowly drawn off through outlet 52, thus creating an evenly sinking top surface as provided for in settling basin A, to assist in causing the metals which have the same specific gravity and sought to be recovered, to settle in the interior 51 of basin D. The double arrows shown in Figure 1 also assist in pointing out the manner in which the valuable metals are caused to circulate in sump C, conduit 48, and to be deposited in settling basin D.

It is to be understood that the phrase "valuable metallic constituents" applies equally as well to all minerals, regardless of their metallic content. Furthermore, while the invention has been illustrated and described as taking one particular form, it is to be understood that the invention is not so limited, but is susceptible of various changes and modifications in structure and in the mode of operation without departing from the spirit thereof. Hence, we do not limit ourselves to the precise construction set forth; and we desire, therefore, that only such limitations shall be placed thereupon as are imposed by and specifically set forth in the appended claims.

Having thus described our invention, what we claim as new and desire to secure by Letters Patent is:

1. An apparatus of the class described, in combination, a tank containing water therein at a predetermined level, a launder communicating with the tank and continuously drawing off water therefrom, means associated with the tank and with the launder for delivering, at a predetermined rate, an aggregate containing valuable metallic constituents into the launder, said aggregate being carried in suspension by the water in the launder, a settling basin communicating with the launder, said settling basin comprising two walls which converge toward each other to form a restricted passage, a pocket formed beyond said restricted passage, a plurality of openings formed through the base of said pocket, and independently operated means associated with each of said openings for covering or uncovering the same when desired, said settling basin adapted to receive valuable metallic constituents contained in the aggregate which are drawn off therefrom at a rate sufficient to form a continuously settling upper surface into which the valuable constituents carried by the water in the launder may settle, a tank disposed below the openings into which the drawn off valuable metallic constituents flow, a conduit communicating with the first-mentioned tank adapted to continuously deliver water to the second-mentioned tank, and means associated with the second-mentioned tank for permitting the settling therein of such metals as have the highest specific gravity, said means adapted for permitting the drawing off therefrom, at a predetermined rate, sufficient metals to provide a continuous lowering of the upper surface of the metals contained therein to permit the settling thereupon of metals having the same specific gravity.

2. Apparatus characterized as in claim 1 wherein the means associated with the second-mentioned tank for permitting the settling therein of such metals as have the highest specific gravity comprises a sump, a nozzle extending into the sump and communicating indirectly with the second mentioned tank, an opening formed in the sump in registerable alignment with said nozzle and in close proximity therewith, a U-shaped conduit extending from said opening and a settling basin communicating with said U-shaped conduit, said settling basin being disposed adjacent said sump and adapted to receive therein metals having the highest specific gravity.

3. The improved method of recovering and separating valuable constituents from auriferous earth, alluvial deposits, beach sand and other like materials, which comprises in maintaining said aggregate in suspension within a confined water course, controlling the rate of flow of said water course by the gradual deposit of a layer of the aggregate, the composition of which is controlled by the specific gravity of the various elements contained within said aggregate so that the uppermost film of the layer contains the elements having the highest specific gravity, relying upon the frictional resistance offered by said layer to the aggregate held in suspension within the water continuing to flow within the water course to gradually reduce the rate of travel of the valuable metals as the aggregate flows over said layer until they have almost reached a state of rest, trapping said valuable metals to a predetermined height, and then continuously drawing off said valuable metals at a rate which will provide a slowly sinking, substantially level surface over the entire top surface of the deposited metallic constituents in order to assist other valuable metals contained in the aggregate flowing in the water course to settle within the trap provided therefor, delivering the drawn off valuable metals into another water course, forcing said valuable metals, under pressure and at high speed, to circulate within a predetermined course, relying upon the metals having the highest specific gravity to come to a state of rest within a trap provided therefor, continuously circulating the metallic constituents within the predetermined course until all of the metals having the highest specific gravity are trapped, and drawing off the metals having the highest specific gravity from the trap at a rate sufficient to provide a slowly sinking upper surface therein to assist in trapping other valuable metals having the same specific gravity.

LEE S. BUSKIRK.
PAUL R. REID.